United States Patent [19]
Burns et al.

[11] Patent Number: 5,772,322
[45] Date of Patent: Jun. 30, 1998

[54] RESONANT MICROBEAM TEMPERATURE SENSOR

[75] Inventors: David W. Burns, Minneapolis; Thomas G. Stratton, Roseville, both of Minn.

[73] Assignee: Honeywell Inc., Minneapolis, Minn.

[21] Appl. No.: 656,501

[22] Filed: May 31, 1996

[51] Int. Cl.$^6$ ........................................... G01K 11/26
[52] U.S. Cl. ................................................. 374/118
[58] Field of Search ............................. 374/118; 73/579

[56] References Cited

U.S. PATENT DOCUMENTS

| | | | |
|---|---|---|---|
| 4,535,638 | 8/1985 | EerNisse et al. | 374/117 |
| 4,765,188 | 8/1988 | Krechmery et al. | 73/708 |
| 5,141,331 | 8/1992 | Oehler et al. | 374/118 |
| 5,275,055 | 1/1994 | Zook et al. | 73/778 |
| 5,417,115 | 5/1995 | Burns | 73/778 |
| 5,458,000 | 10/1995 | Burns et al. | 73/708 |
| 5,511,427 | 4/1996 | Burns | 374/118 |

FOREIGN PATENT DOCUMENTS

| | | | |
|---|---|---|---|
| 0263430 | 11/1987 | Japan | 374/118 |
| 0172714 | 7/1989 | Japan | 374/118 |
| 0573725 | 9/1977 | U.S.S.R. | 374/118 |

*Primary Examiner*—Diego F.F. Gutierrez
*Attorney, Agent, or Firm*—Charles L. Rubow

[57] ABSTRACT

A temperature sensing device employs a resonant polysilicon beam, in combination with electrical circuitry for oscillating the beam at its natural resonant frequency, to sense changes in temperature. The resonant beam is formed as part of a silicon layer, and the silicon layer is in direct contact with a dissimilar material. In one version of the device, the silicon layer is deposited onto a sapphire substrate by low pressure chemical vapor deposition. In another version, the beam is part of a polysilicon layer deposited onto a silicon wafer substrate. The silicon substrate is thinned, then thermoelectrically bonded to a borosilicate glass substrate. In still another version, the silicon substrate is selectively thinned and has deposited thereon a TCE mismatched material. In all versions, temperature is sensed based on a thermal mismatch of the two dissimilar materials. The respective layers expand (and contract) at different rates in response to temperature changes, altering the level of induced axial strain in the resonant beam. The change in induced strain alters the frequency at which the beam oscillates, thereby providing a direct indication of temperature.

23 Claims, 6 Drawing Sheets

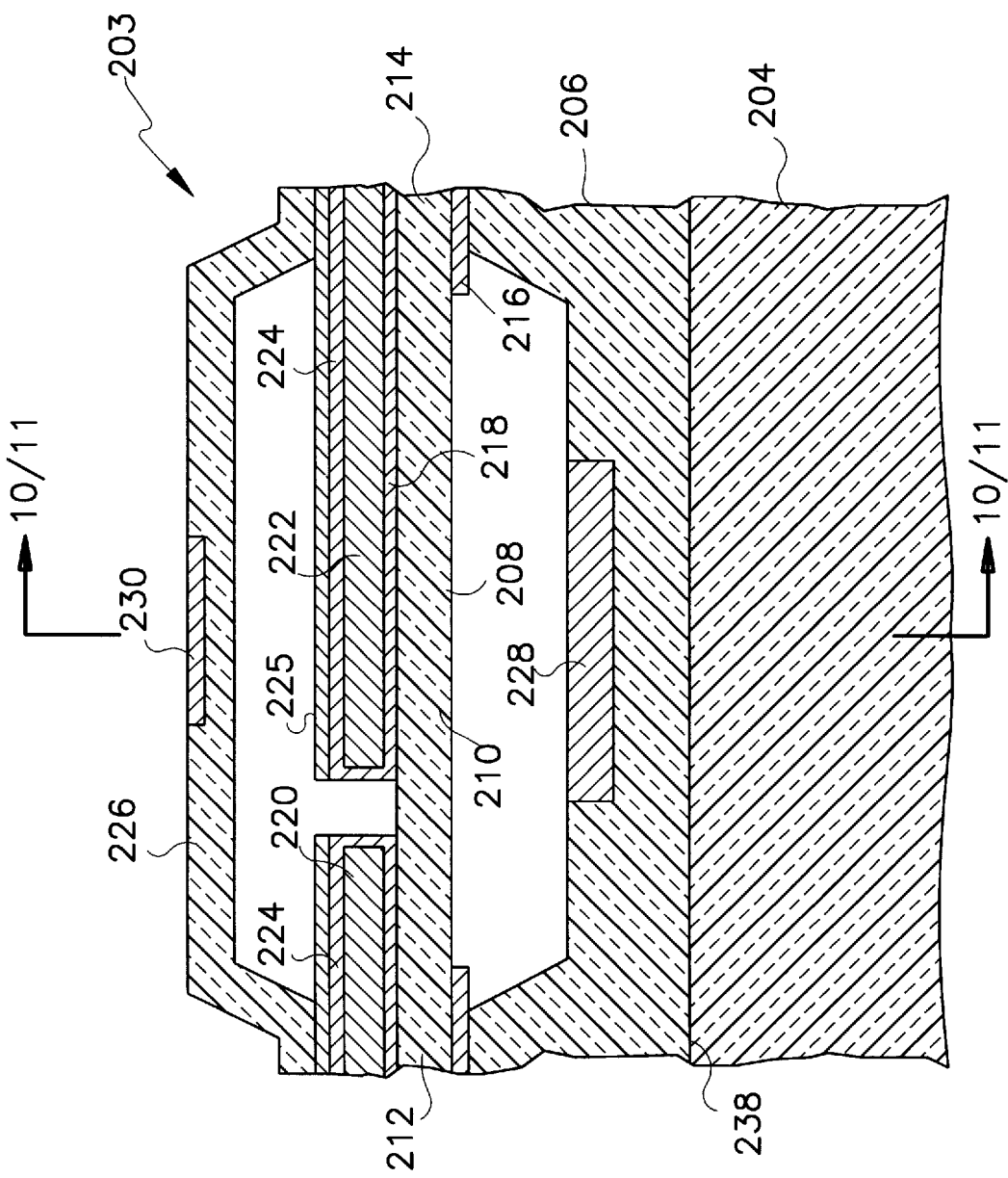

RESONANT MICROBEAM TEMPERATURE SENSOR

BACKGROUND OF THE INVENTION

The present invention relates to vibratory sensing devices that measure variable parameters based on changes in induced strain, and more particularly to devices employing resonant microbeam sensors for measuring temperature.

Vibratory transducers have been used in precision applications to measure pressure and acceleration. These devices operate on the principle that elongate oscillating beams or other members have natural resonant frequencies that vary with the amount of axially induced strain. More particularly, tensile forces elongating a beam increase its resonant frequency, while forces relaxing beam tension or compressing the beam reduce the natural resonant frequency. The frequency output of a resonant beam is readily converted to a digital reading indicative of the measured quantity, requiring only a counter and a reference clock for such conversion.

Accordingly, vibratory transducers are simple and reliable, produce a digital output without analog-to-digital conversion, and provide a high degree of discrimination for accurate measurements.

Vibratory transducers are subject to temperature effects, calling for temperature compensation in instances where a parameter other than temperature is being measured. For example, U.S. Pat. No. 4,765,188 (Krechmery et al) discloses a diaphragm with several piezoresistive strain gauges for sensing pressure induced changes in the diaphragm. A temperature-dependent resistor also is formed on the diaphragm. The output of the temperature-dependent resistor is provided to a programmable read-only memory (PROM) which stores temperature compensation data.

U.S. Pat. No. 4,535,638 (EerNisse et al) discloses a resonating transducer system in which a quartz crystal is driven to oscillate at two frequencies, both of which vary with changes in applied force and changes in temperature. The frequency outputs are processed by a computer containing predetermined coefficients to correct for temperature effects.

U.S. Pat. No. 5,275,055 (Zook et al), owned by the assignee of this application, discloses a vibratory transducer in the form of a resonant integrated microbeam. The device includes a silicon substrate, a polysilicon flexure beam attached at both ends to the substrate, and a rigid polysilicon cover that cooperates with the substrate to provide a sealed vacuum chamber enclosing the flexure beam. A drive electrode on the flexure beam is selectively charged to oscillate the beam. A piezoresistive element on the flexure beam indicates beam position and provides feedback to the beam oscillator, so that the beam tends to oscillate at its natural resonant frequency.

The resonant integrated microbeam is subject to temperature effects. In a pressure transducer or accelerometer, a secondary resonant microbeam subject to temperature changes may be used in combination with the primary resonant microbeam subject to temperature and to the parameter of interest, e.g. pressure or acceleration. This approach is shown in U.S. Pat. No. 5,458,000, (Burns et al.) owned by the assignee of this application.

In an alternative approach, secondary beam is cantilevered to insure that it is subject to temperature fluctuations, while not being subject to changes in pressure or acceleration. Cantilevered microbeams are disclosed in U.S. Pat. No. 5,511,427, (Burns) owned by the assignee of this application.

The temperature effects arise from the natural tendency of a resonant beam to expand with rising temperature and contract as the temperature decreases. While these temperature-induced responses can be substantial in the sense of requiring temperature compensation, they are not of sufficient magnitude (as compared to effects not related to temperature) to enable reliable direct temperature measurement.

Therefore, it is an object of the present invention to provide a device capable of employing an integrated resonant microbeam sensor to directly measure temperature.

Another object is to provide a temperature measuring device sensitive to extremely small temperature changes.

Yet another object is to provide a device that produces a temperature-responsive digital output suitable for use by a digital processor or direct storage in a digital memory, without analog-to-digital conversion.

SUMMARY OF THE INVENTION

To achieve these and other objects there is provided a strain-responsive temperature sensing device. The device includes a support structure composed of two dissimilar materials with dissimilar thermal expansion coefficients. The device further includes a vibratory element for detecting temperature-induced deformations of the support structure. Means are provided for fixing opposite first and second end portions of the vibratory element to the support structure, to maintain the vibratory element for oscillation at a natural resonant frequency that varies with changes in induced strain in the vibratory element. A resonant frequency sensing means detects the natural resonant frequency, and generates an output representing temperature in the region of the vibratory element, based on changes in the natural resonant frequency.

A salient feature of the device is its use of a thermal mismatch between two materials to vary the induced strain in the vibratory element as a function of changes in temperature. The vibratory element and support structure have thermal expansion coefficients (also known as coefficients of linear expansion) that reflect the extent to which they expand and contract with rising and falling temperatures. As the vibratory element and support structure expand (or contract) at different rates, they exert complementary tensile and compressive forces on one another. For example, assuming the support structure has a higher thermal expansion coefficient than the vibratory element, the structure tends to elongate with increasing temperature more than the element. Because these members are secured to one another, the result is an increase in the tensile strain applied to the vibratory element, thereby increasing the natural resonant frequency of the vibratory element. Thus, the increase in frequency is a function of the increase in temperature.

Preferably the vibratory element is an elongate beam formed of a semiconductor material such as polycrystalline silicon. The support structure preferably includes a ceramic substrate, either aluminum oxide (e.g. sapphire) or a borosilicate glass such as that sold under the brand name Pyrex. The respective thermal expansion coefficients may be similar to one another, having a difference in the range of about $0.5$–$20.0 \times 10^{-6}$/degree C. More specifically, in a device in which the difference in thermal expansion coefficients was about $1.1 \times 10^{-6}$/degrees C., the shift in natural resonant frequency was found to be over 600 Hz per degree C.

In one preferred approach, the vibratory element is fabricated monolithically as part of a semiconductor layer applied to a sapphire substrate. The semiconductor layer can be extremely thin (2–20 microns, more preferably 10–20 microns), with the sapphire substrate being about 500 microns in thickness. Because the semiconductor layer is so thin as compared to the substrate, bending effects are negligible. In an alternative approach, a polysilicon vibratory element is fabricated on a silicon substrate in the manner described in aforementioned U.S. Pat. No. 5,275,055.

The silicon substrate wafer is thinned to a dimension of about 250 microns or less, then thermoelectrically bonded to a 500 micron Pyrex glass substrate. Due to bending effects, the temperature response in this alternative is more complex. Nonetheless, appropriate calibration can provide highly accurate association of resonant frequency with temperature.

In another preferred approach, the vibratory element is fabricated monolithically on a silicon substrate which is selectively thinned in the vicinity of the vibratory element, upon which a dissimilar material is deposited. Thermal expansion differences between the deposited material and the thinned region of the substrate cause bending, sensed by shifting of the resonant frequency of the microbeam. The selectively thinned silicon substrate is formed with a U-shaped trench surrounding the vibratory element to reduce undesirable effects of package and mounting stresses. The deposited material can be between 0.1 micron and 2.0 microns thick, with large expansion coefficient mismatches and low mechanical and thermal hysteresis, such as provided by silicon nitride, silicon dioxide or a variety of silicides.

The sensing device is conveniently mounted on a dual in-line package or other semiconductor package. Electronic circuitry for sensing the resonant frequency and for driving the vibratory element at the resonant frequency can also be mounted on the semiconductor package. To minimize the need to compensate for the effects of semiconductor package expansion and contraction, the sensing device preferably is attached to the package in cantilever fashion.

Thus, in accordance with the present invention, induced strain throughout the vibratory element, or resonant microbeam, varies as a function of temperature in the region of the microbeam. Accordingly, the natural resonant frequency of the microbeam is a function of the temperature and can be sensed as a direct temperature measurement. The induced strain in the microbeam is due to a thermal mismatch of the microbeam material and the support material, thus to provide a low cost and simple, yet accurate and reliable temperature transducer.

BRIEF DESCRIPTION OF THE DRAWINGS

FIG. 9 is a sectional view corresponding to that in FIG. 3 illustrating a semiconductor die of an alternative temperature sensing device embodiment;

DESCRIPTION OF THE PREFERRED EMBODIMENTS

Figure 1:
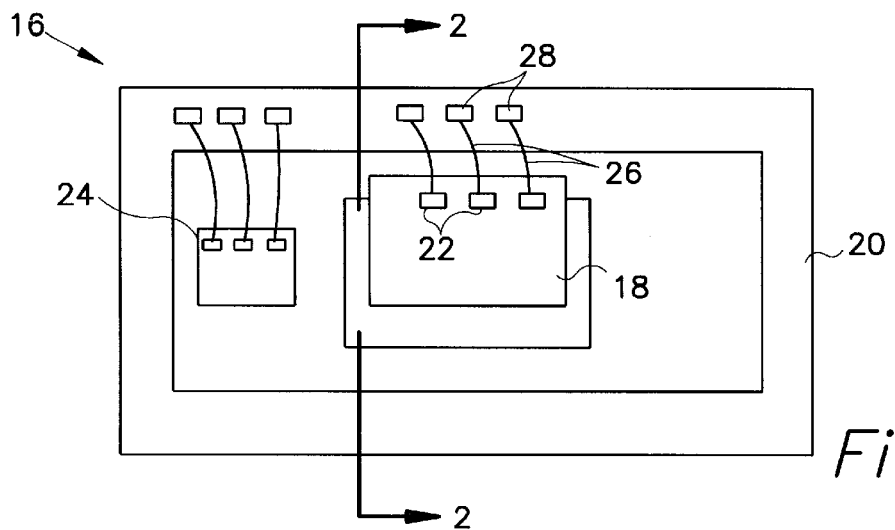
FIG. 1 is a plan view of a temperature sensing device, including a die and a semiconductor package, constructed according to the present invention.
Figure 2:
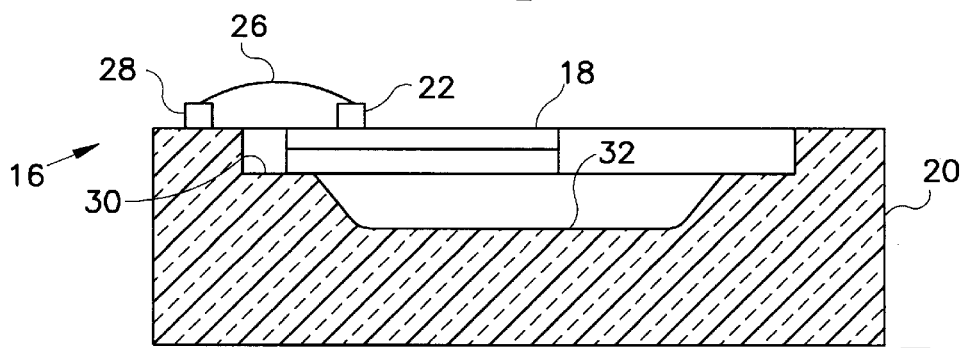
FIG. 2 is a sectional view taken along the line 2—2 in FIG. 1.

Turning now to the drawings, there is shown in FIGS. 1 and 2 a strain-responsive temperature sensing device 16 in the form of a semiconductor die 18 mounted in a semiconductor package 20, more particularly a dual in-line package (DIP). Several electrically conductive contacts or pads 22 are formed along one edge of die 18. As indicated at 24, circuitry for causing a resonant beam to oscillate, and for sensing the frequency at which the beam oscillates, is fabricated as an application specific integrated circuit (ASIC) and mounted on semiconductor package 20. Alternatively, circuitry 24 could be fabricated directly on die 18. Conductive leads 26 electrically couple pads 22 with corresponding pads 28 of package 20.

As best seen in FIG. 2, DIP 20 includes a planar land 30 for supporting die 18. Preferably an epoxy adhesive is employed to bond the die to the land along part of a planar bottom surface of the die. Thus, the die is mounted in cantilever fashion, extending away from land 30 over a trough 32 of DIP 20. Cantilevered mounting of die 18 enhances its accuracy and efficiency, by minimizing packaging and mounting stresses.

Figure 3:
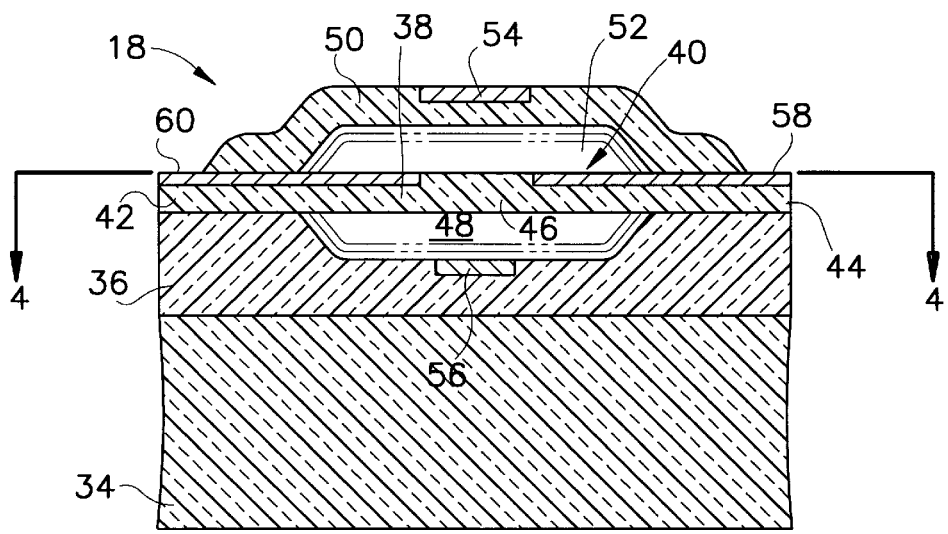
FIG. 3 is an enlarged view of a portion of the structure shown in FIG. 2.

As seen in FIG. 3, die 18 includes a substrate 34 preferably of sapphire. More generally, substrate 34 can be formed of aluminum oxide or another ceramic material. A semiconductor layer 36 is formed onto substrate 34 and is preferably a fine-grain, low tensile strain polysilicon (polycrystalline silicon) or single crystal silicon. A further polysilicon layer 38 is formed over layer 36 to provide a resonant beam 40. Beam 40 has a length in the range of about 50–1,000 micrometers, and more preferably about 200 micrometers. The beam thickness ranges from about 0.5 to about 5.0 micrometers, and more preferably is about 2 micrometers. The beam width ranges from about 20 to about 100 micrometers, and more preferably is about 40 micrometers. Beam 40 is elongate in a longitudinal direction (from left to right as viewed in FIG. 3), and has opposite fixed ends 42 and 44. Due to its elasticity, beam 40 can oscillate, whereby a medial region 46 of the beam reciprocates transversely (vertically in the Figure) relative to layer 36 and substrate 34. A well or trough 48 is formed in semiconductor layer 36 immediately below medial region 46 to accommodate beam oscillation.

A substantially rigid shell or cover 50, formed of polysilicon, is fixed with respect to semiconductor layer 36 and substrate 34 and is positioned directly above the beam. Cover 50 and semiconductor layer 36 cooperate to define a chamber 52. Beam 40 oscillates within the chamber, which is evacuated to provide a vacuum.

An upper bias electrode 54 is formed in cover 50 by boron ion implantation. A lower bias electrode 56 similarly is formed in semiconductor layer 36 along the bottom of trough 48. Electrodes 54 and 56 are used in concert to generate a constant and uniform electric field in the region about beam 40. Further electrical circuit components are formed on beam 40, including a drive electrode 58 used to oscillate the beam and a piezoresistor 60 used to sense the position of beam 40 with respect to semiconductor layer 36, cover 50 and substrate 34, as the beam oscillates.

Figure 4:
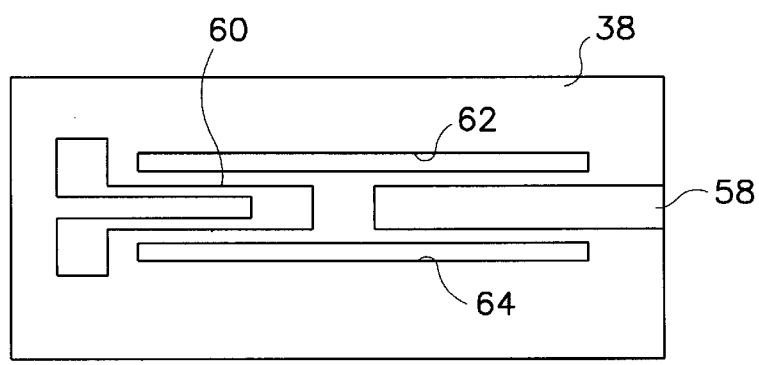
FIG. 4 is a sectional view taken along the line 4—4 in FIG. 3.

Resonant beam 40 is formed as part of a larger polysilicon thin film, i.e. layer 38 seen in FIG. 4. The beam shape is defined by a pair of spaced apart longitudinal gaps 62 and 64 through the beam layer. Beam 40 supports electrical circuitry used in oscillating the beam and in sensing the position as it oscillates. This circuitry includes drive electrode 58 and piezoresistor 60, both formed along the top surface of the beam. The drive electrode and piezoresistor are coplanar and spaced apart from one another. Drive electrode 58 and piezoresistor 60 are electrically isolated from one another. As shown in FIGS. 3 and 4, these electrodes are formed by boron ion implantation. Alternatively, the electrodes can be encapsulated by dielectric layers, illustrated in an alternative embodiment shown in FIG. 9.

Figures 5A, 5B, 5C:
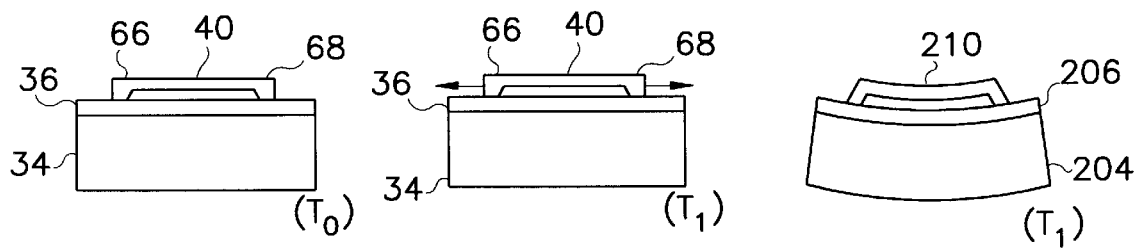
FIGS. 5a–5c are block diagrams illustrating the principle of operation of the applicants' sensing device.

Temperature sensing device 16 indicates temperature by the frequency at which beam 40 oscillates. The principal of operation is schematically illustrated in FIGS. 5a and 5b, showing beam 40 and substrate 34. The opposite ends of the beam are fixed, integral with the substrate. Fixation points are shown at 66 and 68. In FIG. 5a, the temperature is $T_o$. The temperature in FIG. 5b, $T_1$, is higher than $T_o$.

Assuming that substrate 34 applies virtually no stress to beam 40 at temperature $T_o$, the beam oscillates at a resonant frequency that reflects the absence of induced strain. As the temperature increases to $T_1$, both beam 40 and substrate 34 expand, increasing the distance between fixation points 66 and 68. Assuming that the substrate has a higher coefficient of thermal expansion than the beam, it tends to expand more than the beam in response to the temperature increase, separating points 66 and 68 by a distance greater than would occur under beam expansion alone. The result is a tensile force applied to beam 40 as indicated by the arrows in FIG. 5b.

Of course, there is a force equilibrium under which an equal and opposite comprehensive force is applied to the substrate, giving rise to a tendency for the beam and substrate to bend from the planar configuration of FIG. 5a to an upwardly concave configuration, illustrated in FIG. 5c. However, if beam 40 (and the remainder of polysilicon layer 38) is sufficiently thin as compared to substrate 34, bending due to the beam is insignificant.

In this preferred embodiment, sapphire substrate 34 has a thickness of about 500 microns, and silicon layer 36 has a thickness in the range of 2–20 microns, more preferably about 10–20 microns. Thus, there is no measurable bending effect due to the silicon layer. As is apparent, the support structure of which substrate 34 is an element, has a thickness greater than ten times the about 0.5 to about 5.0 micron thickness of beam 40. The impact of the thermal mismatch is concentrated along beam 40, enhancing its sensitivity to temperature changes. In this instance, the induced tensile strain tends to elongate beam 40 and thus increases its natural resonant frequency.

The strain applied to beam 40 is given by the equation:

$$\epsilon = (\alpha_2 - \alpha_1)(T_1 - T_o) \quad (1)$$

where $\epsilon$ is the induced strain, $\alpha_1$ is the thermal expansion coefficient of substrate 34, $\alpha_2$ is the thermal expansion coefficient of semiconductor layer 36 including beam 40, $T_o$ is a reference temperature associated with a predetermined base natural resonant frequency of the beam, and $T_1$ is the measured temperature. The base frequency corresponds to a virtual absence of induced strain. Accordingly, if $T_1$ is equal to $T_o$, there is no measurable induced strain and beam 40 oscillates at the base frequency. The quantity $\alpha_2 - \alpha_1$, is a constant, preferably in the range of from about 0.5 to about $20.0 \times 10^{-6}$/degree C., and about $5.5 \times 10^{-6}$/degree C. for silicon on sapphire.

If $T_1$ is lower than $T_o$, or if substrate 34 has the lower thermal expansion coefficient, then the forces applied to the beam (FIG. 5b) are compressive and reduce the natural resonant frequency.

To maintain oscillation of the beam, a periodically oscillating voltage level is provided to drive electrode 58 while a substantially uniform constant electric field is maintained in the region about the beam. For a more detailed explanation of beam oscillation, reference is made to previously identified U.S. Pat. No. 5,275,055. Piezoresistor 60 detects the instantaneous position of beam 40 relative to the substrate and cover by generating a detector voltage that varies with the beam position, and thus provides a periodic signal when the beam is oscillating.

The detector voltage is provided as an input to an oscillator circuit 70 (FIG. 6), the output of which is a periodic drive voltage signal. The drive signal is provided to drive electrode 58 to maintain beam 40 in steady state oscillation at its natural resonant frequency. For a polysilicon beam like beam 40, the natural resonant frequency tends to be in the range of 50–1200 kHz. The oscillator circuit provides a closed loop for continually adjusting the drive signal frequency toward coincidence with the natural resonant frequency.

A power supply (not shown) provides a biasing voltage +V at a node 72, preferably 5 volts. A capacitor 74 provides filtering to prevent high frequency feedback. Piezoresistor 60 and a voltage divider resistor 76 cooperate to set the voltage at the base of an NPN transistor 78. The emitter of the transistor is grounded through a resistor 80. As the resistance of piezoresistor 60 changes with beam position, the voltage at the base of transistor 78 also changes. The transistor functions as an emitter follower, providing a low-impedance emitter output responsive to the high-impedance base input.

A capacitor 82 filters out the d.c. component of the signal to provide an a.c. signal to an amplifier 84 which functions as a digital inverter, providing a substantial gain and a 180 degree phase shift to the a.c. signal. A resistor 86 in a feedback loop provides a d.c. bias, tending to maintain the input within a linear response range. The output of amplifier 84 is provided to an output buffer amplifier 88. The buffer amplifier output is provided to a digital counter 90 controlled by a clock oscillator 92. The counter output is provided to digital circuitry (not shown) for a direct, real time reading of the resonant frequency of the oscillating beam and thus the temperature.

The output of amplifier 84 also is provided to a capacitor 94 for further d.c. filtering and then to drive electrode 58 as the drive signal. Resistors 98 and 100 provide a voltage divider which limits the amplitude of the drive signal, e.g. from a range of −5 to +5 volts to about −1 to +1 volt.

Should a change in strain cause beam 40 to oscillate at a different frequency, the frequency change is sensed in piezoresistor 60 and the resultant signal is provided to transistor 78 at the altered frequency. The output of amplifier 84 likewise is altered to change the drive voltage signal frequency. Thus, the drive signal frequency is continually and controllably adjusted toward coincidence with the natural resonant frequency of the beam. A high degree of accuracy and sensitivity to slight changes in strain is realized because of the considerable change in the resonant frequency for slight variations in strain. For example, for a thermal mismatch of about $1.1 \times 10^{-6}$/degree C., and a microbeam length of about 300 micrometers, width of 40 micrometers and thickness of 20 micrometers, the base frequency is 190.5 kHz and the shift in frequency is more than 600 Hz/degree C.

Figure 7:
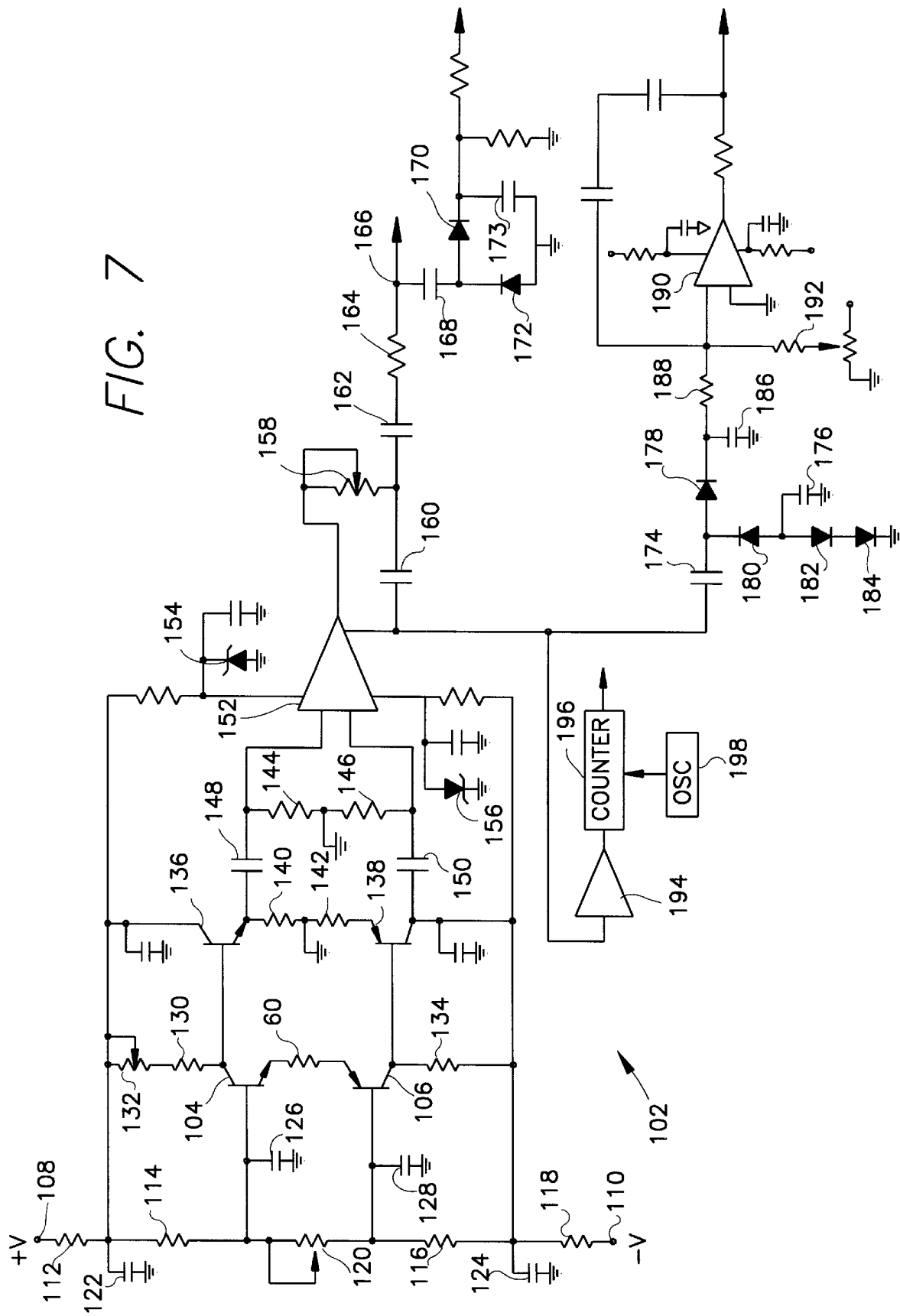
FIG. 7 is a schematic diagram of alternative circuitry for oscillating the microbeam and sensing its oscillation.

FIG. 7 illustrates an alternative circuit 102 for oscillating beam 40 and sensing the natural resonant frequency. Circuit 102 employs complementary common base amplifier stages that share piezoresistor 60 as a common emitter resistor. A substantially constant voltage is maintained through piezoresistor 60. Accordingly, current across the piezoresistor varies as beam 40 oscillates, and is amplified by circuit 102.

Piezoresistor 60 is connected in common to the emitters of an NPN transistor 104 and a PNP transistor 106. Inputs to the respective bases of transistors 104 and 106 are determined by a power supply (not shown) that sets voltage levels at nodes 108 and 110, preferably at 12 volts and –12 volts. Resistors 112, 114, 116 and 118 function as voltage dividers, and resistor 120 between the transistor base inputs is adjustable to set the bias. Capacitors 122, 124, 126 and 128 provider filtering and prevent high frequency feedback.

NPN transistor 104 has a collector resistor in the form of a fixed resistor 130 and an adjustable resistor 132. Similarly, PNP transistor 106 has a collector resistor 134. Resistor 132 is adjustable to permit balancing of the gains of these transistors. Any change in the current through piezoresistor 60 also changes the current through the collector resistors. The collector outputs are a.c. voltages that also vary with the piezoresistor current. The collector outputs are provided to the base inputs of an NPN transistor 136 and a PNP transistor 138, respectively. Resistors 140 and 142 divide the voltage between the emitter terminals of transistors 136 and 138. Resistors 144 and 146 also divide the voltage and capacitors 148 and 150 filter out the d.c. signal component. Thus, transistors 136 and 138 function as emitter follower buffers for the collector outputs of transistors 104 and 106, respectively, to substantially reduce impedance. The respective emitter outputs are provided to a high-speed, broadband differential amplifier 152. Zener diodes 154 and 156 are provided to limit amplitude swings in amplifier 152.

A phase shifter, including a potentiometer 158 and a capacitor 160, receives the amplifier output. The phase shifted output is provided (filtered) through a capacitor 162 and a resistor 164 to a node 166. Node 166 provides the drive signal to the drive electrode. Beyond node 166, a capacitor 168, diodes 170 and 172 and a capacitor 173 provide automatic gain control circuitry. Diodes 170 and 172 act as attenuators, in that their a.c. impedances change with the d.c. bias applied to the diodes.

The output of amplifier 152 also is provided to a half-wave peak detector including capacitors 174 and 176 and diodes 178, 180, 182 and 184. The peak detector generates a d.c. voltage proportional to the a.c. peak amplitude received. The peak detector output is provided (filtered) through a capacitor 186 and a resistor 188 to an operational amplifier 190 configured as an integrator.

More particularly, amplifier 190 sets a low voltage (approximately ground) on the right side of resistor 188 as viewed in the figure. The current through resistor 188 thus varies with the d.c. voltage output of the peak detector. Current also flows through a resistor 192, the amount being fixed, depending on the setting of potentiometer 158.

Operational amplifier 190 senses any difference between the current through resistor 188 and resistor 192. If a difference is sensed, amplifier 190 applies a corrective d.c. output voltage to the attenuator, to either increase or decrease the a.c. amplitude. This in turn increases or decreases the d.c. amplitude of the peak detector output, adjusting the current through resistor 188 toward coincidence with the predetermined current through resistor 192. Thus, the attenuator behaves as an adjustable resistor that cooperates with resistor 164 to provide a voltage divider.

Figure 6:
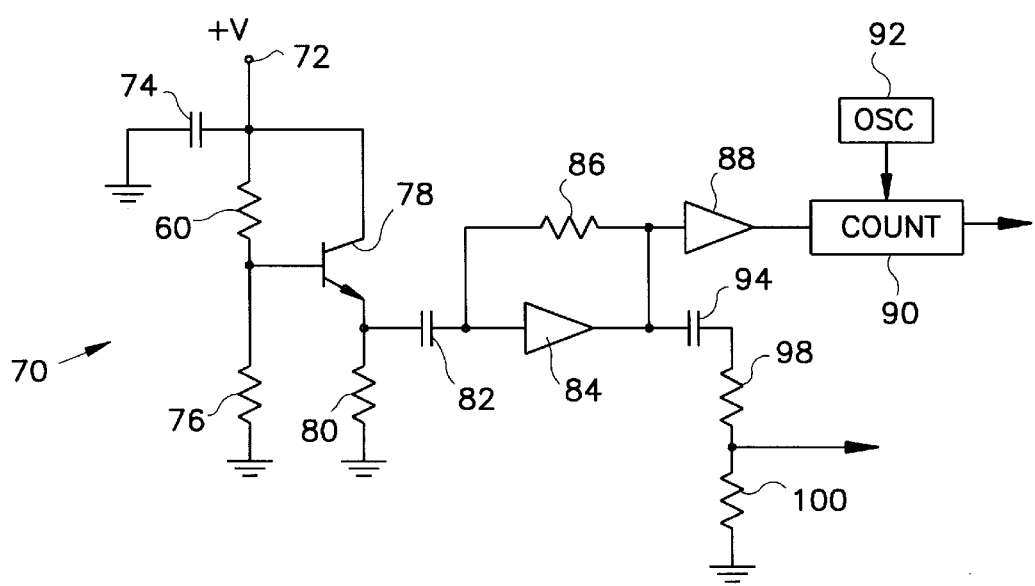
FIG. 6 is a schematic diagram of circuitry for oscillating a resonant microbeam in the applicants' device and for sensing the frequency of oscillation.

The output of high-speed differential amplifier 152 further is provided to a buffer amplifier 194, and then to a digital counter 196 controlled by a clock oscillator 198. This provides a direct, real-time reading of temperature in the same manner as indicated in FIG. 6.

Figure 8:
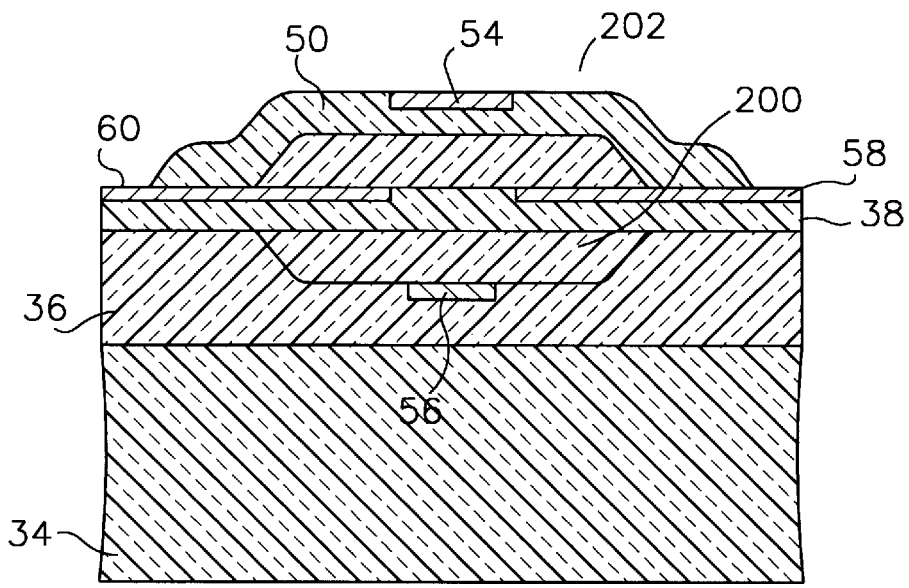
FIG. 8 is a cross sectional view of the die used in the applicants' device at an intermediate stage of fabrication.

Semiconductor die 18 is fabricated monolithically by depositing a layer of polycrystalline silicon onto sapphire substrate 34 by low pressure chemical vapor deposition (LPCVD). Alternatively, a signal crystal silicon on sapphire (SOS) substrate can be used. A trough is formed in semiconductor layer 36 and electrode 56 is formed at the bottom of the trough by boron ion implantation. A lower sacrificial layer of silicon dioxide ($SiO_2$) is formed by local oxidation as indicated at 200 (FIG. 8). Etch channels also are formed by oxidation at this stage. A thin film layer of fine-grain, low-stress polycrystalline silicon is deposited onto layer 36 and the sacrificial material to provide beam layer 38.

Next, drive electrode 58, piezoresistor 60 and the necessary electrical leads for these components are formed on polysilicon beam layer 38 by boron ion implantation. Polysilicon is selectively removed from layer 38 by reactive ion etching, to define a beam and remove polysilicon from above the etch channels.

A low temperature oxide sacrificial layer 202 is deposited onto layer 38 and selectively etched to define an upper chamber volume. Then, a layer of polysilicon is deposited onto the oxide layer to form cover 50. Electrode 54 is formed on cover 50 by ion implantation. All of the polysilicon layers preferably are deposited at temperatures of about 580 degrees C. to form nearly amorphous rather than polycrystalline films.

Electrical contact openings and etch channel openings are formed by reactive ion etching. Then, sacrificial layers 200 and 202 are removed by HF etching to form chamber 52 (FIG. 3). A vacuum is formed within chamber 52 as explained in the aforementioned U.S. Pat. No. 5,275,055.

FIG. 9 shows an alternative temperature sensing device 203 including a borosilicate glass substrate (preferably Pyrex glass) 204, and a single crystal silicon base layer 206. For purposes of avoiding any confusion, borosilicate glass substrate 204 and silicon base layer 206 respectively correspond to the layers of first and second materials to which reference is made elsewhere in this description. A polysilicon layer 208 applied over base layer 206 includes an elongate beam 210 supported at its opposite ends 212 and 214. A dielectric thin film layer 216 of polycrystalline silicon material is deposited between base layer 206 and polysilicon layer 208 to isolate the beam layer from the base. A second dielectric thin film layer 218 is formed on the beam to electrically isolate the beam from electrical circuitry including a piezoresistor 220 and a drive electrode 222. A third dielectric thin film layer 224 is deposited onto the drive electrode and piezoresistor, cooperating with dielectric layer 218 to encapsulate the circuit components. Dielectric layer 224 and a passivation layer 225 further isolate the circuit components from a polysilicon cover 226. Electrodes 228 and 230 are formed in base layer 206 and in cover 226, respectively.

In this embodiment, Pyrex glass is the preferred material for substrate 204. While materials other than Pyrex glass may provide a larger thermal mismatch with the silicon layer, the thermoelectric bond of the silicon and Pyrex wafers is known to have low hysteresis. The thermal mismatch, which is on the order of $1.0 \times 10^{-6}$/degree C., affords sensitivity sufficient for most applications.

Fabrication of sensing device 203 begins with formation of a trough and a lower bias electrode (by local boron ion implantation) in a silicon wafer which forms base layer 206. A lower sacrificial oxide layer 234 (FIG. 10) is formed in the silicon wafer by local oxidation to define a lower cavity. Etch channels (not shown) are patterned along side the trough. A silicon nitride layer is deposited, patterned and etched to provide dielectric layer 216.

Figure 10:
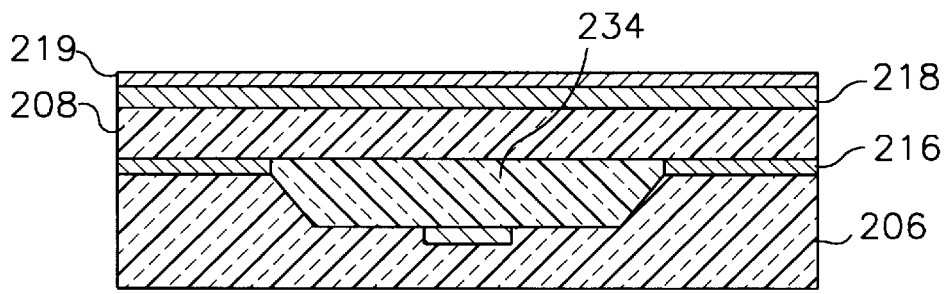
FIGS. 10 and 11 are cross sectional views taken along line 10/11—10/11 in FIG. 9 of the die at intermediate stages of fabrication.

Next, polysilicon is deposited over the dielectric layer to form layer 208 containing resonant beam 210 (FIG. 9). Silicon nitride is deposited onto layer 208 to provide dielectric layer 218 (FIG. 10). Next, polysilicon is deposited onto dielectric layer 218 to form a layer 219 for the drive electrode and piezoresistor. Polysilicon layer 219 is doped with boron or phosphorous to enhance its electrical conductivity.

Piezoresistor 220, drive electrode and their associated conductive paths are patterned into layer 219. The layer is selectively etched to remove the doped polysilicon, except for the circuit components. Further silicon nitride is deposited to provide dielectric layer 224, and cooperates with dielectric layer 218 to encapsulate the circuit components. Because the circuit components are formed by etching rather than by ion implantation, they are better defined and more precisely controlled.

Figure 11:
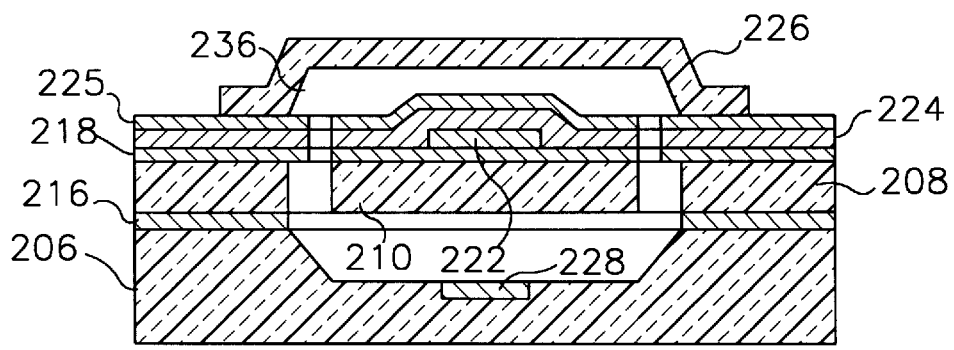

The layers above base layer 206 and sacrificial layer 234 are selectively patterned and etched to define beam 210, and a low temperature oxide is deposited as a sacrificial layer to define an upper cavity 236. Once the cavity is defined, polysilicon is deposited onto the sacrificial layer and passivation layer 225 to form cover 226 (FIG. 11). Electrode 230 (FIG. 9) is formed by boron ion implantation. The sacrificial layers are then removed by etching to form a chamber. For further details regarding this process, reference is made to U.S. Pat. No. 5,417,115 (Burns) entitled "Dielectrically Isolated Resonant Microsensors", assigned to the assignee of the present application.

Next, silicon base layer 206 is selectively etched or thinned, reducing its thickness dimension from about 500 microns to about 250 microns. The thinned silicon base is thermoelectrically bonded at 238 (FIG. 9) to Pyrex substrate 204, thus to complete fabrication.

Pyrex substrate 204 has a thickness of about 500 microns. The combined thickness of silicon layer 206 and polysilicon layer 208 is about 250 microns. Consequently, bending caused by temperature excursions is sufficient to materially affect the level of induced axial strain in beam 210. More particularly, and with reference to FIG. 5c, an increase in temperature from $T_o$ to $T_1$ causes bending from a planar to an upwardly concave configuration, assuming that glass substrate 204 has the higher thermal expansion coefficient. Thus the bending mitigates the change in the induced strain. A temperature decrease would lead to an upwardly convex configuration in FIG. 5c which also would mitigate the change in induced strain. In either event, the relationship between changes in temperature and changes in induced strain becomes more complex, as reflected in the following equation:

$$\epsilon = (\alpha_2 - \alpha_1)(T_1 - T_0)\left[1 - \left[\frac{(t+h)}{4} - \frac{(E_2 - E_1)th}{4E_2h + E_1t}\right]\left[\frac{E_1E_2th(t+h)b}{(E_2h + E_1)ET}\right]\right] \quad (2)$$

where $\alpha_1$ is the thermal coefficient of substrate 204 expansion; $\alpha_2$ is the thermal coefficient of expansion of silicon base layer 206; $T_o$ is a base temperature corresponding to virtually no induced strain; $T_1$ is the actual temperature; t is the substrate thickness; h is the silicon layer thickness; b is the width of substrate 204 and silicon layer 206; $E_1$ is the modulus of elasticity (Young's modulus) of the substrate; and $E_2$ is Young's modulus of the silicon layer. The quantity ET is computed according to the formula:

$$ET = b\left[\frac{E_2^2h^4 + E_1t^4 + 6E_1E_2h^2t^2 + 4E_1h^3t}{12(E_2h + E_1t)}\right] \quad (3)$$

As the thickness h of the silicon layer is reduced, above equations (2) and (3) tend toward equation (1), reflecting the fact that for a silicon layer thickness h sufficiently small as compared to the substrate thickness t, bending effects become negligible.

With reference to both sensing devices 16 and 203, several factors influence the sensitivity of beams to changes in temperature. One is the selection of materials that provide the thermal mismatch. The greater the difference in thermal expansion coefficients, the greater the change in natural resonant frequency in response to a given temperature change. At the same time, a severe thermal mismatch limits the range of temperatures over which the sensing device responds with accuracy. A mismatch of about $1.0 \times 10^{-6}$/ degree C. provides a frequency shift of more than 600 Hz for a single degree change in temperature. Thus, sensitivity does not require extreme thermal mismatch.

Sensitivity also can be altered by changing beam geometry. In particular, sensitivity varies with the quantity $$\left(\frac{L}{h_b}\right)^2,$$

where the quantity L is the beam length and $h_b$ is the beam thickness. Thus, subject to structural limitations, sensitivity can be increased fourfold by doubling the beam length, or by reducing the beam thickness by one-half. There is no preference as to which of the substrate and the silicon layer has the higher coefficient of thermal expansion. However, the substrate should have the higher modulus of elasticity, i.e. be the more rigid material. Greater flexibility in the silicon layer enhances the change in induced strain for a given temperature change.

Thus in accordance with the present invention, a resonating microbeam is employed to provide a direct digital output representing temperature based on the frequency at which the microbeam oscillates. The resonant frequency of the beam varies linearly with changes in induced axial strain. As the frequency shifts considerably in response to slight changes in strain, devices employing the microbeams are sensitive to extremely small changes in temperature. Changes in the induced axial strain arise from a thermal mismatch of the beam material and the material forming a substrate on which the semiconductor layer containing beam is fixed. The substrate material can be selected to achieve a desired sensitivity and range of temperatures over which the sensing device is accurate.

Figure 12A:
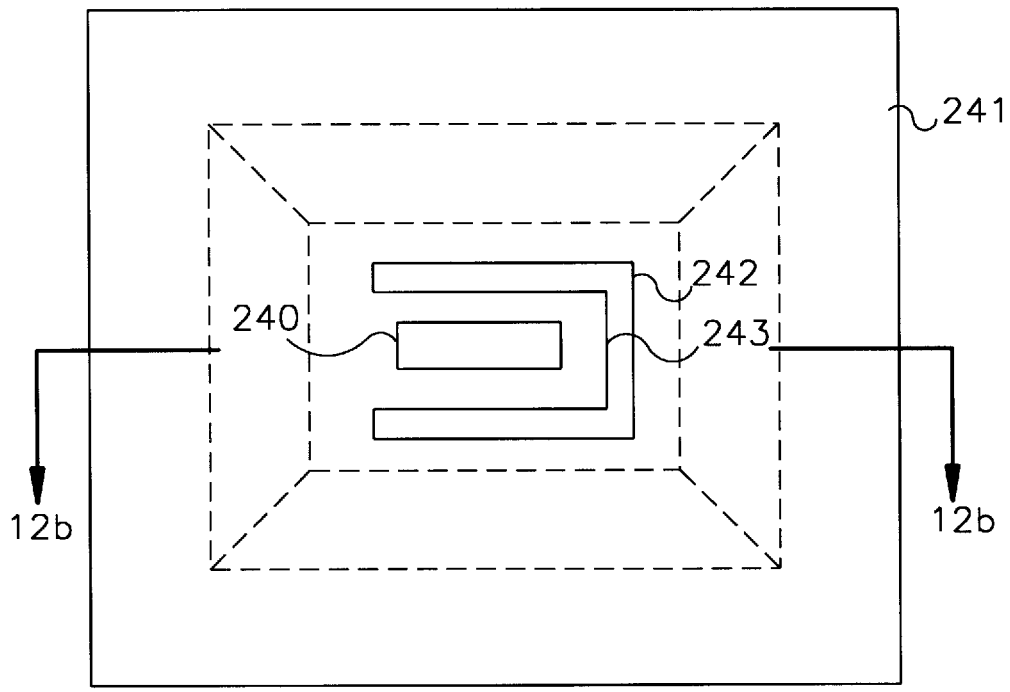
FIGS. 12a–12c illustrate embodiments of the invention employing thermally mismatched deposited films.
Figure 12B:
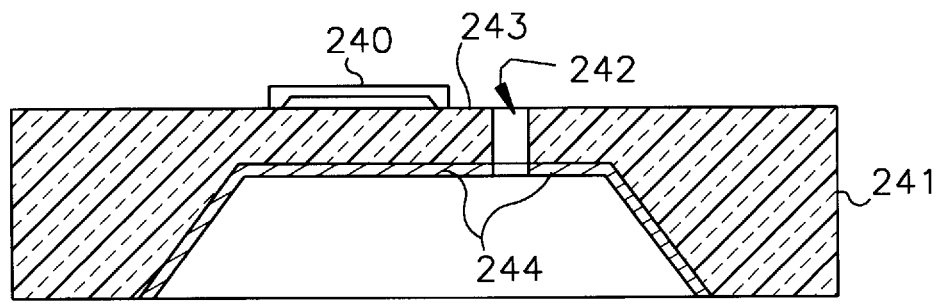
Figure 12C:
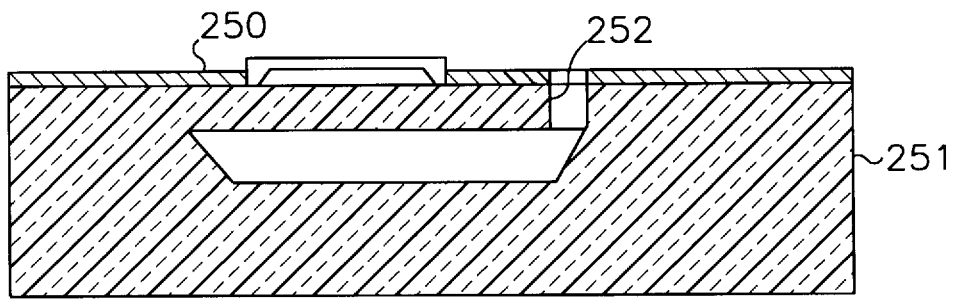

In the embodiment illustrated in FIGS. 12a and 12b, a microbeam 240 is fabricated on a silicon substrate 241. After microbeam fabrication, a U-shaped trench 242 is fashioned into the substrate. The substrate is selectively thinned from the backside, forming a cantilevered silicon beam or paddle 243. A TCE mismatched film 244 such as an oxide, nitride or silicide thin film, is deposited on the bottom side of the paddle to form a bimorph. Increases in temperature cause bending of the bimorph, which alters the resonant frequency of the microbeam. Alternatively, a TCE mismatched film 250 can be deposited on the top side of a silicon substrate 251, as illustrated in FIG. 12c, with selective etching of the substrate from the top side to form a paddle 252.

What is claimed is:

1. A strain-responsive temperature sensing device, comprising:

a support structure including a substrate of a first material having a first thermal expansion coefficient and a layer of a second material having a second thermal expansion coefficient different than the first thermal expansion coefficient, the layer of a second material being in intimate contact with the substrate so as to induce strain in said support structure with changes in temperature;

a vibratory element having opposite first and second end portions, and a means for fixing the first end portion and the second end portion to the support structure, to maintain the vibratory element for oscillation at a natural resonant frequency that varies with changes in induced strain in the vibratory element; and a resonant frequency sensing means for detecting the natural resonant frequency of said vibratory element and for generating an output representing temperature in the region of the vibratory element, based on the natural resonant frequency.

2. The device of claim 1 wherein:
said vibratory element is an elongate beam formed of a semiconductor material.

3. The device of claim 2 wherein:
said semiconductor material is a polycrystalline silicon.

4. The device of claim 3 wherein:
the semiconductor material of which said vibratory element is formed has a thickness in the range of from about 0.5 to about 5.0 micrometers, and said support structure has a thickness at least ten times the thickness of the semiconductor material of which said vibratory element is formed.

5. The device of claim 3 wherein:
the substrate of said support structure comprises a borosilicate glass substrate; and
the layer of a second material of said support structure comprises single crystal silicon layer bonded to the borosilicate glass substrate.

6. The device of claim 3 wherein:
the substrate of said support structure comprises a locally thinned silicon substrate; and
the layer of a second material of said support structure comprises a thin film of the second material deposited on said locally thinned silicon substrate.

7. The device of claim 6 wherein said support structure includes a U-shaped feature etched through the locally thinned silicon substrate, with said vibratory element located within the boundary of the U-shaped feature.

8. The device of claim 6 wherein the second material is selected from a group consisting of oxides, nitrides and suicides.

9. The device of claim 1 wherein:
the substrate of said support structure is an insulating substrate.

10. The device of claim 9 wherein:
the substrate is formed of aluminum oxide.

11. The device of claim 9 wherein:
the layer of a second material of said support structure is a semiconductor layer applied to the insulating substrate, and said vibratory element is an elongate beam formed of the same material as the semiconductor layer.

12. The device of claim 11 wherein:
said insulating substrate consists essentially of sapphire, and said semiconductor layer consists essentially of a polycrystalline silicon.

13. The device of claim 9 wherein:
said insulating substrate is formed of a borosilicate glass.

14. The device of claim 13 wherein:
the layer of a second material of said support structure comprises a silicon base layer bonded to the borosilicate glass substrate.

15. The device of claim 14 wherein:
said support structure further comprises a dielectric layer applied to the silicon base layer.

16. The device of claim 15 wherein:
the silicon base layer consists essentially of single crystal silicon, and the support dielectric layer consists essentially of a polycrystalline silicon.

17. The device of claim 1 wherein:
the difference between the first and second thermal expansion coefficients is within the range of from about 0.5 to about $20.0 \times 10^{-6}$/degree C.

18. The device of claim 1 wherein:
the substrate of said support structure has a modulus of elasticity equal or greater than that of the layer of a second material of said support structure.

19. The device of claim 9 further including:
a semiconductor package, and an adhesive means mounting said insulating substrate to said semiconductor package.

20. The device of claim 19 wherein:
said insulating substrate is mounted to said semiconductor package in cantilever fashion.

21. The device of claim 19 wherein said frequency sensing means comprises:

a position sensing means for sensing the position of said vibratory element relative to said support structure, and generating a position signal indicating the position of said vibratory element as it oscillates; and an oscillating means for driving said vibratory element in a periodic mechanical oscillation relative to said support structure, said oscillating means receiving the position signal and controllably adjusting the frequency of the periodic mechanical oscillation toward coincidence with the natural resonant frequency of said vibratory element.

22. The device of claim 21 wherein said oscillating means comprises:

a drive electrode formed on said vibratory element;
means for generating a substantially uniform electrical field in the region of said vibratory element;
means for generating a periodically varying drive voltage; and
means for applying the drive voltage to said drive electrode.

23. The device of claim 22 wherein:
said means for generating a periodically varying drive voltage is mounted on said semiconductor package.

* * * * *

UNITED STATES PATENT AND TRADEMARK OFFICE
CERTIFICATE OF CORRECTION

PATENT NO. : 5,772,322
DATED : June 30, 1998
INVENTOR(S) : David W. Burns, Thomas G. Stratton It is certified that error appears in the above-identified patent and that said Letters Patent is hereby corrected as shown below:

Claim 5, line 5, after "comprises" insert --a--.

Claim 16, line 3, delete "support".

Signed and Sealed this

Twenty-fourth Day of November,1998

Attest:

BRUCE LEHMAN

*Attesting Officer*     *Commissioner of Patents and Trademarks*